(12) United States Patent
Sugimoto et al.

(10) Patent No.: US 6,331,360 B1
(45) Date of Patent: Dec. 18, 2001

(54) THERMOPLASTIC ELASTOMER COMPOSITION AND POWDER AND MOLDED ARTICLE THEREOF

(75) Inventors: Hiroyuki Sugimoto, Funabashi; Yoshihiro Nakatsuji, Chiba; Hidetake Hozumi, Ichihara, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/142,691

(22) PCT Filed: Mar. 15, 1997

(86) PCT No.: PCT/JP97/00794

§ 371 Date: Sep. 14, 1998

§ 102(e) Date: Sep. 14, 1998

(87) PCT Pub. No.: WO97/33940

PCT Pub. Date: Sep. 18, 1997

(30) Foreign Application Priority Data

| Mar. 15, 1996 | (JP) | 8-059102 |
| May 20, 1996 | (JP) | 8-124462 |
| May 15, 1996 | (JP) | 8-120354 |
| May 15, 1996 | (JP) | 8-120355 |
| May 15, 1996 | (JP) | 8-120358 |

(51) Int. Cl.[7] .................................................. B32B 27/32
(52) U.S. Cl. ........................ 428/523; 428/500; 525/191; 525/194
(58) Field of Search ..................................... 428/500, 503; 525/232, 191, 193, 194, 192

(56) References Cited

U.S. PATENT DOCUMENTS

| 5,308,700 | * | 5/1994 | Hikasa et al. ............................ 428/402 |
| 5,840,229 | * | 11/1998 | Sugimoto et al. ...................... 264/142 |
| 5,843,577 | * | 12/1998 | Ouhadi et al. ........................ 428/474.7 |

FOREIGN PATENT DOCUMENTS

| 482778 A2 | 4/1992 | (EP) . |
| 515223 A1 | 11/1992 | (EP) . |
| 540941 A1 | 5/1993 | (EP) . |
| 604776 A1 | 7/1994 | (EP) . |
| 5-1183 | 1/1993 | (JP) . |
| 5-5050 | 1/1993 | (JP) . |
| 6-256538 | 9/1994 | (JP) . |
| 7-102126 | 4/1995 | (JP) . |
| 7-126452 | 5/1995 | (JP) . |
| WO 93/01236 | 1/1993 | (WO) . |

* cited by examiner

*Primary Examiner*—Blaine Copenheaver
*Assistant Examiner*—Christopher Paulraj

(57) ABSTRACT

A thermoplastic elastomer composition comprising (a) 100 wt. parts of a polyolefin resin, (b) 5 to 250 wt. parts of an ethylene-α-olefin copolymer rubber in which the content of the α-olefin units is at least 50 wt. %, and (c) 0 to 500 wt. parts of an ethylene-α-olefin copolymer rubber in which the content of the α-olefin units is less than 50 wt. %. This composition can provide a molded article which is hardly whitened when it is bent, and has good flexiblity.

21 Claims, 2 Drawing Sheets

THERMOPLASTIC ELASTOMER COMPOSITION AND POWDER AND MOLDED ARTICLE THEREOF

FIELD OF THE INVENTION

The present invention relates to a thermoplastic elastomer composition, and a powder and a molded article of the same.

PRIOR ART

Sheet-form molded articles having complicated uneven decorations such as grains or stitches are used as skin materials of interior parts of automobiles and the like. As such molded articles, molded articles of thermoplastic elastomers are proposed as substitutes for conventional molded articles of vinyl chloride resins (see, for example, JP-A-5-001183 and JP-A-5-005050). However, the molded articles of thermoplastic elastomers have lower flexibility than those of vinyl chloride resins, and tend to be whitened when they are bent. Thus, the molded articles of the thermoplastic elastomers are easily whitened at bent portions when they are removed from a mold in the molding process for the production of molded articles or when they are preshaped before they are laminated onto substrates. Therefore, it is desired to provide molded articles of thermoplastic elastomers which are less whitened on bending.

SUMMARY OF THE INVENTION

The present inventors have made extensive study on thermoplastic elastomers which can provide molded articles which are less whitened on bending. As a result, it has been found that a thermoplastic elastomer composition comprising a polyolefin resin and a specific ethylene-$\alpha$-olefin copolymer rubber in a specific ratio can provide a molded article which is hardly whitened, and the present invention has been completed.

According to the first aspect, the present invention provides a thermoplastic elastomer composition comprising (a) 100 wt. parts of a polyolefin resin, (b) 5 to 250 wt. parts of an ethylene-$\alpha$-olefin copolymer rubber in which the content of the $\alpha$-olefin units is at least 50 wt. %, and (c) 0 to 500 wt. parts of an ethylene-$\alpha$-olefin copolymer rubber in which the content of the $\alpha$-olefin units is less than 50 wt. %.

According to the second aspect, the present invention provides a powder comprising the above thermoplastic elastomer composition and having a sphere-converted average particle size of 1.2 mm or less and a bulk specific gravity of at least 0.38.

Such a powder is used in a powder molding method and can provide a molded article which has neither pinholes nor underfills and also good flexibility so that it is hardly whitened when it is bent.

According to the third aspect, the present invention provides a molded article comprising the above thermoplastic elastomer composition. The molded article of the present invention is hardly whitened when it is bent.

DETAILED DESCRIPTION OF THE INVENTION

Figure 1:
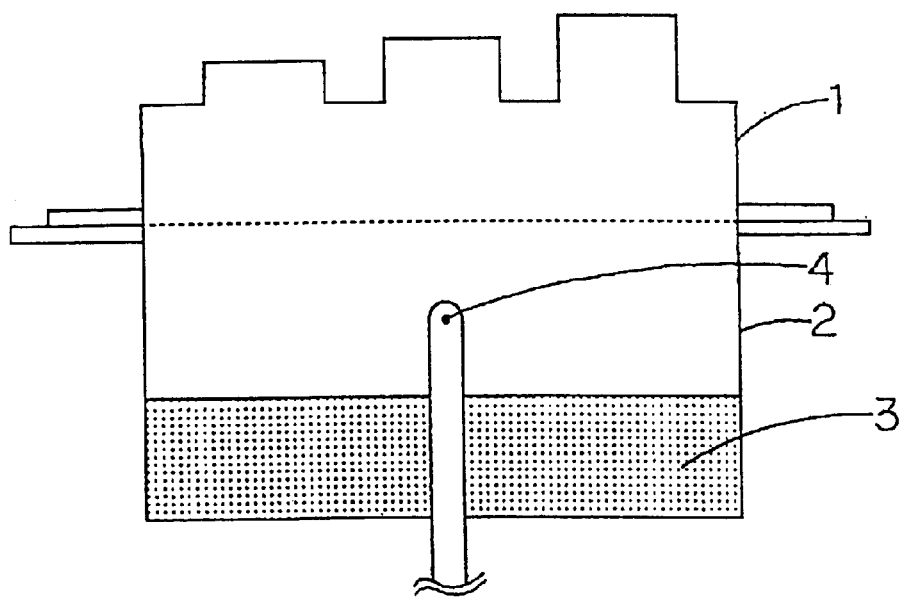
FIG. 1 is a schematic view of a molding machine for powder molding, which comprises a container (2) for receiving the powder (3) of a thermoplastic elastomer composition, and a mold (1) for powder slush molding.

The thermoplastic elastomer composition of the present invention comprises (a) 100 wt. parts of a polyolefin resin, (b) 5 to 250 wt. parts of an ethylene-$\alpha$-olefin copolymer rubber in which the content of the $\alpha$-olefin units is at least 50 wt. %, and (c) 0 to 500 wt. parts of an ethylene-$\alpha$-olefin copolymer rubber in which the content of the $\alpha$-olefin units is less than 50 wt. %.

The polyolefin resin (a) is at least one crystallizable resin selected from the group consisting of polymers and copolymers which comprise at least one olefin. Examples of the olefin are ones having 2 to 8 carbon atoms such as ethylene, propylene, 1-butene, 1-hexene, 1-octene, and the like. Examples of the polyolefin resin are polyethylene, polypropylene, polybutene-1, copolymers of propylene and an $\alpha$-olefin other than propylene (e.g. 1-butene, etc.).

When the polyolefin resin (a) is a propylene-ethylene copolymer or a propylene-1-butene copolymer, the thermoplastic elastomer composition of the present invention can provide molded articles having excellent flexibility. Copolymers can be used, which are prepared by copolymerizing at least two monomers selected from the group consisting of ethylene and $\alpha$-olefins having 3 to 8 carbon atoms in two or more polymerization steps. For example, a copolymer can be used, which is prepared by homopolymerizing propylene in the first step and copolymerizing propylene with ethylene or an $\alpha$-olefin other than propylene in the second step.

When a molded article is produced by a powder molding method using the powder of the thermoplastic elastomer composition of the present invention, the polyolefin resin (a) has a melt flow rate (MFR) of from 20 to 500 g/10 min., preferably from 50 to 300 g/10 min. when measured according to JIS K-7210 at 230° C. under a load of 2.16 kgf, from the viewpoint of the strength of the produced molded articles.

The ethylene-$\alpha$-olefin copolymer rubber (b) is at least one rubber selected from amorphous ethylene-$\alpha$-olefin copolymers in which the content of the $\alpha$-olefin units is at least 50 wt. %. Examples of the $\alpha$-olefin are those having 3 to 8 carbon atoms such as propylene, 1-butene, 1-hexene, 1-octene, etc. Among them, $\alpha$-olefins having 4 to 8 carbon atoms, in particular, 4 to 6 carbon atoms are preferable.

The content of the $\alpha$-olefin units in the ethylene-$\alpha$-olefin copolymer rubber (b) is preferably from 50 to 90 wt. %, more preferably from 60 to 90 wt. %.

The ethylene-$\alpha$-olefin copolymer rubber (b) may further contain, as monomeric units, a non-conjugated diene having 5 to 12 carbon atoms such as dicyclopentadiene, 2-methyl-2,5-norbornadiene, 5-ethylidene-2-norbornene, 1,4-hexadiene, 1,6-octadiene, etc.; aromatic vinyl compounds having 8 to 12 carbon atoms such as styrene, $\alpha$-methylsyrene, 2,5-dimethylstyrene, p-methylstyrene; and the like.

The content of the $\alpha$-olefin units can be calculated from absorbances at peaks assigned to the $\alpha$-olefin units (for example, a peak due to the symmetric deformation vibration of terminal methyl groups of short-chain branches, or a peak due to the rocking vibration of methylene groups in the branches) which are measured by an infrared spectrophotometry. This measurement of the $\alpha$-olefin unit content is described in, for example, (1) "POLYMER ANALYSIS HANDBOOK" (KOUBUNSHI BUNSEKI HANDOBUKKU), Chapter 2, Section 2.2, pages 587–591 (1995) (edited by the Japan Analytical Chemistry Society, published by KINOKUNIYA SHOTEN), and (2) "CHEMISTRY DOMAIN" (KAGAKU NO RYOIKI), Extra Issue No. 140 "INFRARED, RAMAN AND VIBRATION [II] Present Situation and Future Prospects, pages 73–81 (1983) (edited by Naomichi Tsuboi, et al., published by NANKODO).

The ethylene-α-olefin copolymer rubber (b) can be prepared by polymerizing ethylene, α-olefin and other optional monomer using a metal complex as an polymerization initiator in the presence of a co-catalyst, as disclosed in JP-A-3-163088 and JP-A-5-194641.

Examples of a co-catalyst are aluminum compounds such as methylaluminooxane, aluminum halides, aluminumalkyl halides, trialkylaluminums, etc.; and Lewis acids having a boron atom such as tris(pentafluorophenyl)borane, triphenylcarbeniumtetrakis(pentafluorophenyl)borane, etc. The co-catalysts maybe used singly or in a combination of two or more compounds.

Examples of the metal complex are zirconium complexes such as (tert.-butylamide)dimethyl($\eta^5$-cyclopentadienyl) silane-zirconium dichloride, etc.; and titanium complexes such as (tert.-butylamide)dimethyl(tetrametyl-$\eta^5$-cyclopentadienyl)-silanetitanium dichloride, (anilide) (dimethyl)(tetramethyl-$\eta^5$-cyclopentadienyl)-silanetitanium dichloride, etc. The metal complexes may be supported on a carrier such as alumina, magnesium chloride, silica and the like.

Ethylene and an α-olefin are copolymerized usually in a solvent. Examples of the solvent are hydrocarbons such as hexane, heptane, toluene, ethylbenzene, xylene, and the like. The copolymerization may be carried out in the atmosphere of an inert gas such as nitrogen, argon, hydrogen, etc. under atmospheric pressure or reduced pressure. A polymerization temperature is usually from −30 to +250° C.

The amount of the ethylene-α-olefin copolymer rubber (b) in the thermoplastic elastomer composition of the present invention is from 5 to 250 wt. parts, preferably from 20 to 250 wt. parts, more preferably from 50 to 250 wt. parts, in particular from 80 to 220 wt. parts, per 100 wt. parts of the polyolefin resin (a).

When the amount of the ethylene-α-olefin copolymer rubber (b) is less than 5 wt. parts, the obtained molded articles lose flexibility and remarkably tend to be whitened when they are bent. When the amount of the copolymer rubber (b) exceeds 250 wt. parts, the surfaces of the obtained molded articles tend to have large tackiness.

The thermoplastic elastomer composition of the present invention may contain up to 500 wt. parts of the ethylene-α-olefin copolymer rubber (c) per 100 wt. parts of the polyolefin resin (a). When the ethylene-α-olefin copolymer rubber (c) is contained in the thermoplastic elastomer composition, the cold resistance (low-temperature impact resistance) of molded articles produced from such a composition can be improved.

The ethylene-α-olefin copolymer rubber (c) is at least one copolymer selected from the group consisting of amorphous ethylene-α-olefin copolymers and amorphous ethylene-α-olefin-non-conjugated diene copolymers, which have an α-olefin unit content of less than 50 wt. %.

Preferable examples of the α-olefin are ones having 3 to 10 carbon atoms such as propylene, 1-butene, 3-methylpentene-1, 1-octene, 1-decene, and the like. In particular, propylene and 1-butene are preferable.

Preferable examples of the non-conjugated diene are dicyclopentadiene, 2-methyl-2,5-norbornadiene, ethylidenenorbornene, 1,4-hexadiene, cyclooctadiene, methylenenorbornene, 1,6-octadiene, and the like. In particular, ethylidenenorbornene is preferable.

Examples of the ethylene-α-olefin copolymer rubber (c) include ethylene-propylene copolymer rubbers, ethylene-1-butene copolymer rubbers, and ethylene-propylene-ethylidenenorbornene copolymer rubbers (EPDM). The thermoplastic elastomer composition of the present invention comprising EPDM can provide molded articles having excellent heat resistance and tensile properties.

The content of α-olefin units in the ethylene-α-olefin copolymer rubber (c) is preferably from 5 to 40 wt. %, more preferably from 10 to 35 wt. %, while the content of ethylene units is usually from 60 to 95 wt. %, preferably from 65 to 90 wt. %. The contents of the olefin and ethylene units can be measured by a $^{13}$C-NMR analysis, an infrared spectrophotometry, and the like.

When molded articles are produced by a powder molding method from the powder of the thermoplastic elastomer composition of the present invention, the ethylene-α-olefin copolymer rubber (c) preferably has a Mooney viscosity ($ML_{1+4}(100°)$) of from 10 to 350, more preferably from 15 to 300, when measured according to ASTM D-927-57T at 100° C., from the viewpoint of the strength of the obtained molded articles.

The amount of the ethylene-α-olefin copolymer rubber (c) in the thermoplastic elastomer composition of the present invention is usually from 0 to 500 wt. parts per 100 wt. parts of the polyolefin resin (a). The amount of the ethylene-α-olefin copolymer rubber (c) is preferably from 5 to 400 wt. parts, more preferably from 10 to 250 wt. parts, from the viewpoint of the cold resistance (low-temperature impact resistance).

In the thermoplastic elastomer composition of the present invention, the polyolefin resin (a), the ethylene-α-olefin copolymer rubber (b) and the ethylene-α-olefin copolymer rubber (c) may be crosslinked intermolecularly and/or intramolecularly. That is, the polyolefin resin (a) may be intermolecularly and/or intramolecularly crosslinked, the ethylene-α-olefin copolymer rubber (b) may be intermolecularly and/or intramolecularly crosslinked, or the ethylene-α-olefin copolymer rubber (c) may be intermolecularly and/or intramolecularly crosslinked. Furthermore, the polyolefin resin (a) and the ethylene-α-olefin copolymer rubber (b), or the polyolefin resin (a) and the ethylene-α-olefin copolymer rubber (c), or the ethylene-α-olefin copolymer rubber (b) and the ethylene-α-olefin copolymer rubber (c) may be intermolecularly crosslinked. For example, the polyolefin resin (a) and/or the ethylene-α-olefin copolymer rubber (c) can be crosslinked by kneading them, and further dynamic crosslinking the kneaded mixture.

The dynamic crosslinking of the kneaded mixture can be carried out by kneading the mixture and a crosslinking agent while heating.

As a crosslinking agent, usually an organic peroxide such as 2,5-dimethyl-2,5-di(tert.-butylperoxy)hexane, dicumylperoxide, etc. may be used. The crosslinking agent is used in an amount of 1 wt. part or less, preferably from 0.1 to 0.8 wt. part, more preferably from 0.2 to 0.6 wt. part, per 100 wt. parts of the total amount of the polyolefin resin (a), the ethylene-α-olefin copolymer rubber (b) and the ethylene-α-olefin copolymer rubber (c).

In the case of the use of an organic peroxide as a crosslinking agent, a thermoplastic elastomer composition, which provides molded articles having good heat resistance, can be obtained, when the dynamic crosslinking is carried out in the presence of a crosslinking aid such as a bismaleimide compound. In this case, the amount of the organic peroxide is usually 0.8 wt. part or less, preferably from 0.2 to 0.8 wt. part, more preferably from 0.4 to 0.6 wt. parts, per 100 wt. parts of the total amount of the polyolefin resin (a), the ethylene-α-olefin copolymer rubber (b) and the ethylene-α-olefin copolymer rubber (c).

The amount of the crosslinking aid is usually 1.5 wt. parts or less, preferably from 0.2 to 1 wt. part, more preferably from 0.4 to 0.8 wt. part, per 100 wt. parts of the total amount of the polyolefin resin (a), the ethylene-α-olefin copolymer rubber (b) and the ethylene-α-olefin copolymer rubber (c).

The crosslinking aid is added to the composition prior to the addition of the crosslinking agent. In general, the crosslinking aid is added when the components (a), (b) and (c) are kneaded.

The polyolefin resin (a), the ethylene-α-olefin copolymer rubber (b) and the ethylene-α-olefin copolymer rubber (c) can be crosslinked by kneading these components, a crosslinking agent and an optional crosslinking aid with a single- or twin-screw extruder while heating.

The dynamic crosslinking under the above conditions preferentially crosslinks intermolecularly and/or intramolecularly the ethylene-α-olefin copolymer rubber (b) and the ethylene-α-olefin copolymer rubber (c), while the polyolefin resin (a) may be intermolecularly and/or intramolecularly crosslinked, or the polyolefin resin (a) and the ethylene-α-olefin copolymer rubber (b) may be intermolecularly crosslinked, or the polyolefin resin (a) and the ethylene-α-olefin copolymer rubber (c) may be intermolecularly crosslinked, or the ethylene-α-olefin copolymer rubber (b) and the ethylene-α-olefin copolymer rubber (c) may be intermolecularly crosslinked. The thermoplastic elastomer composition of the present invention can contain any types of crosslinked materials.

The thermoplastic elastomer composition of the present invention may contain any additives in addition to the above main components. Examples of the additives are mineral oil-based softening agents such as paraffinic process oils, phenol-based, sulfite-based, phenylalkane-based, phosphite-based, amine-based or amide-based heat stabilizers, age resistors (antioxidants), weather stabilizers, antistatic agents, metal soaps, lubricants such as waxes, internal mold release agents such as methylpolysiloxane, pigments, fillers, foaming agents, foaming aids, foam stabilizers, and the like. Among them, the mineral oil-based softening agents are preferable, since they can improve the melt flowability of the thermoplastic elastomer composition of the present invention, and the thermoplastic elastomer composition containing such a softening agent can provide molded articles having good flexibility.

When a mixture of the above ethylene-α-olefin copolymer rubber (c) and the mineral oil-based softening agent, that is, an oil-extended ethylene-α-olefin copolymer rubber, is used in the production process of the thermoplastic elastomer composition of the present invention, good processability can be attained in the kneading and dynamic crosslinking processes.

The content of the mineral oil-based softening agent in the oil-extended ethylene-α-olefin copolymer rubber is usually 120 wt. parts or less, preferably from 30 to 120 wt. parts, per 100 wt. parts of the ethylene-α-olefin copolymer rubber (c).

The thermoplastic elastomer composition of the present invention may contain other polymer, insofar as the effects of the present invention are not impaired, and examples of the other polymer are elastomeric polymers such as natural rubbers, butyl rubbers, cycloroprene rubbers, acrylonitrile-butandiene rubbers, hydrogenated acrylonitrile-butadiene rubbers, epichlorohydrin rubbers, acrylic rubbers, etc.; ethylene-acrylic acid copolymers; ethylene-vinyl acetate copolymers and their saponified products; ethylene-methyl methacrylate copolymers; ethylene-glycidyl methacrylate-vinyl acetate copolymers; and the like.

The viscolasticity of the thermoplastic elastomer composition of the present invention may vary in a wide range in accordance with the molding conditions of the composition. When the thermoplastic elastomer composition of the present invention is used to prepare a powder which is used in the powder molding method and produced by a freeze-grinding method which will be explained below, the complex dynamic viscosity $\eta^*(1)$ of the composition measured at a frequency $\omega$ of 1 radian/sec. at 250° C. is preferably $1.5 \times 10^5$ poises or less, more preferably $5 \times 10^3$ poises or less, in particular $3 \times 10^3$ poises or less from the viewpoint of the molding processability of the composition. The lower limit of $\eta^*(1)$ of the composition is usually $1 \times 10^2$ poises, preferably $3 \times 10^2$ poises, more preferably $5 \times 10^2$ poises.

Herein, a complex dynamic viscosity $\eta^*(\omega)$ measured at a frequency $\omega$ and at 250° C. is calculated from a storage viscoelasticity G' ($\omega$) and a loss viscoelasticity G'' ($\omega$) according to the following formula (1):

$$\eta^*(\omega)=(1/\omega)\,[(G'(\omega))^2+(G''(\omega))^2]^{1/2} \quad (1)$$

When $\eta^*(1)$ exceeds $1.5 \times 10^5$ poises, the thermoplastic elastomer composition has insufficient melt flowability, and the processability of the composition in the powder molding method tends to deteriorate.

A Newtonian viscosity index n is 0.67 or less, preferably from 0.01 to 0.35, more preferably from 0.03 to 0.25 from the viewpoint of the mechanical strength of the molded articles. Here, a Newtonian viscosity index n is calculated from the above complex dynamic viscosity $\eta^*(1)$ and a complex dynamic viscosity $\eta^*(100)$ measured at a frequency $\omega$ of 100 radian/sec. at 250° C. according to the following formula (2):

$$n=[\log \eta^*(1)-\log \eta^*(100)]/2 \quad (2)$$

When a thermoplastic elastomer composition is used in the production of a powder by a solvent-treating method, a strand cutting method or a die-face cutting method, which will be explained below, the complex dynamic viscosity $\eta^*(1)$ of the composition is preferably $5 \times 10^4$ poises or less, more preferably from $1 \times 10^2$ to $3 \times 10^3$ poises, in particular from $3 \times 10^2$ to $2 \times 10^3$ poises from the viewpoint of the processability of the thermoplastic elastomer composition. The Newtonian viscosity index n of such a thermoplastic elastomer composition is preferably 0.28 or less, more preferably from 0.01 to 0.25, in particular from 0.03 to 0.20, from the viewpoint of the mechanical strength of the produced molded articles.

The thermoplastic elastomer composition of the present invention can be prepared by kneading the polyolefin resin (a), the ethylene-α-olefin copolymer rubber (b) and optionally the ethylene-α-olefin copolymer rubber (c). When the ethylene-α-olefin copolymer rubber (c) is used, firstly the polyolefin resin (a) and the ethylene-α-olefin copolymer rubber (c) are kneaded, and then the ethylene-α-olefin copolymer rubber (b) is added and further kneaded.

Furthermore, the thermoplastic elastomer composition of the present invention, in which the polyolefin resin (a) and/or the ethylene-α-olefin copolymer rubber (c) are intermolecularly and/or intramolecularly crosslinked, is usually prepared by dynamic crosslinking the polyolefin resin (a) and the ethylene-α-olefin copolymer rubber (c), and then adding the ethylene-α-olefin copolymer rubber (b), followed by further kneading. Here, a single- or twin-screw extruder and the like can be used to knead the ethylene-α-olefin copolymer rubber (b).

Alternatively, the thermoplastic elastomer composition of the present invention can be-prepared by dynamic crosslinking the mixture of the polyolefin resin (a), ethylene-α-olefin copolymer rubber (b) and ethylene-α-olefin copolymer rubber (c).

The above methods provide the thermoplastic elastomer composition of the present invention in the form of a molten mixture.

The optional additives can be compounded by the use of the polyolefin resin (a), the ethylene-α-olefin copolymer rubber (b) or the ethylene-α-olefin copolymer rubber (c) which contains such additives, or by compounding such additives to the mixture of the components (a), (b) and (c) in the course of kneading or dynamic crosslinking.

The thermoplastic elastomer composition of the present invention can be processed in the form of molded articles having various sizes and forms by a variety of molding methods. Molded articles produced from the thermoplastic elastomer composition of the present invention is characterized in that they are hardly whitened when they are bent. For example, the thermoplastic elastomer composition of the present invention can be molded in various types of molded articles by press molding, injection molding or extrusion molding a melt, for example, the above molten mixture of the composition.

The forms and sizes of molded articles are not limited.

The thermoplastic elastomer composition of the present invention can be processed to obtain powders having various sizes and shapes, and such powders are used to produce molded articles such as sheets or films by powder molding methods.

The above-described sphere-converted average particle size is preferably 1.2 mm or less, more preferably from 0.15 to 1.0 mm from the viewpoint of the easiness of fusion bonding of particles in the powder molding. When the particles are insufficiently fusion bonded, the molded articles are apt to have pinholes or underfills.

The bulk specific gravity of the powder is preferably at least 0.38, more preferably from 0.38 to 0.65, in particular from 0.42 to 0.65 from the viewpoint of the easiness of adhesion of the powder to mold surfaces in the powder molding. When the powder is insufficiently adhered to the mold surfaces, the molded articles are apt to have pinholes or underfills.

Herein, a sphere-converted average particle size means a diameter of a sphere having the same volume as the average volume of powder particles. The average volume (V) of powder particles is defined by the following formula:

$$V=W/D$$

in which W is the total weight of randomly sampled 100 particles of a thermoplastic elastomer composition powder, and D is a density of the thermoplastic elastomer composition.

The bulk specific gravity of a powder is defined and measured according to JIS K-6721.

Such a powder can be produced by various methods, which will be explained below.

Freeze-grinding method:

A thermoplastic elastomer composition is cooled to a temperature lower than its glass transition temperature (usually −70° C. or less, preferably −90° C. or less) and then ground.

Solvent-treating method:

The powder of a thermoplastic elastomer composition, which is produced by the above freeze-grinding method, is stirred in a solvent having a low compatibility with the thermoplastic elastomer composition in the presence of a dispersant and an emulsifier at a temperature higher than the melting point of the thermoplastic elastomer composition, preferably a temperature 30 to 50° C. higher than the melting point, and then cooled (see, for example, JP-A-62-280226). This method produces spherical particles.

Strand cutting method:

A molten thermoplastic elastomer composition is extruded through a die into an air to form strands, and then the strands are cooled and cut (see, for example, JP-A-50-149747).

Die-face cutting method:

A molten thermoplastic elastomer composition is extruded from a die into water, and cut.

In the above solvent treating method, ethylene glycol, polyethylene glycol, polypropylene glycol, or the like is used as a solvent in an amount of from 300 to 1,000 wt. parts, preferably from 400 to 800 wt. parts, per 100 wt. parts of the thermoplastic elastomer composition.

As a dispersant, an ethylene-acrylic acid copolymer, anhydrous silicic acid, titanium oxide, or the like is used in an amount of usually from 5 to 20 wt. parts, preferably from 10 to 15 wt. parts, per 100 wt. parts of the thermoplastic elastomer composition.

As an emulsifier, polyoxyethylene sorbitan monolaurate, polyethylene glycol monolaurate, sorbitan tristearate, or the like is used in an amount of usually from 3 to 15 wt. parts, preferably from 5 to 10 wt. parts, per 100 wt. parts of the thermoplastic elastomer composition.

In the strand cutting method, a die opening has a diameter of usually from 0.1 to 3 mm, preferably from 0.2 to 2 mm. The discharged amount of the thermoplastic elastomer composition from each die opening is usually from 0.1 to 5 kg/hr., preferably from 0.5 to 3 kg/hr. The haul-off rate of a strand is usually from 1 to 100 m/min., preferably from 5 to 50 m/min. The cooled strand is cut in a length of usually 1.4 mm or less, preferably from 0.3 to 1.2 mm.

In the die-face cutting method, a die opening has a diameter of usually from 0.1 to 3 mm, preferably from 0.2 to 2 mm. The discharged amount of the thermoplastic elastomer composition from each die opening is usually from 0.1 to 5 kg/hr., preferably from 0.5 to 3 kg/hr. The temperature of water is usually from 30 to 70° C., preferably from 40 to 60° C.

The powders produced by the above solvent-treating method, strand-cutting method and die-face cutting method may be called "pellets".

The powder of the thermoplastic elastomer composition can be used in various powder molding methods such as a powder slush molding method, a fluidized bed dipping method, an electrostatic coating method, a powder spray coating method, a rotational powder molding, and the like.

For example, the powder slush molding is carried out as follows:

The powder of a thermoplastic elastomer composition is supplied on the mold surface of a mold which is heated at a temperature higher than the melt temperature of the thermoplastic elastomer composition, usually from 160 to 300° C., preferably from 210 to 270° C. The powder is heated on the mold surface for a certain period of time, and powder particles, at least the surfaces of which are molten, are allowed to fuse together. After the certain period of time, non-fused powder particles are recovered. If necessary, the mold carrying the fused thermoplastic elastomer composition is further heated. After that, the mold is cooled, and a formed sheet is removed from the mold. In such a method, the mold is heated by any method such as a gas heating furnace method, a heat transfer medium-circulation method, a dipping method in a heat transfer medium or hot fluidizing sand, a radiofrequency induction heating method, and the like.

A heating time to fuse together the particles of the thermoplastic elastomer composition is fitly selected according to the sizes, thickness and the like of desired molded articles.

The molded articles of the present invention, which are produced from the thermoplastic elastomer composition of the present invention, have characteristics that they have good flexibility and are hardly whitened when they are bent.

Foamed molded articles with good flexibility can be produced using the thermoplastic elastomer composition of the present invention which contains a foaming agent by various molding methods such as a powder molding method, a press molding method, an extrusion molding method, an injection molding method, and the like.

A foaming agent may be any conventional heat-decomposable foaming agent. Examples of such a heat-decomposable foaming agent are azo compounds such as azodicarbonamide, 2,2'-azobisisobutyronitrile, diazodiaminobenzene, etc.; sulfonylhydrazide compounds such as benzenesulfonylhydrazide, benzene-1,3-sulfonylhydrazide, p-toluenesulfonylhydrazide, etd.; nitroso compounds such as N,N'-dinitrosopentamethylenetetraamine, N,N'-dinitroso-N,N'-dimethylterephthalamide, etc.; azide compounds such as terephthalazide, etc.; carbonates such as sodium hydrogencarbonate, ammonium hydrogencarbonate, ammonium carbonate, etc.; and the like. Among them, azodicarbonamide is preferably used.

A foaming agent is compounded in the composition at a temperature of lower than the decomposition temperature of the foaming agent. The thermoplastic elastomer composition of the present invention may contain a foaming aid or a foam stabilizer together with a foaming agent. Alternatively, a foamed article can be produced by powder molding a mixture of a foaming agent and the powder of the thermoplastic elastomer composition of the present invention containing no foaming agent.

A molded article produced from the thermoplastic elastomer composition of the present invention may be, for example, a two-layer molded article wherein a foamed layer is laminated. Such a two-layer molded article can be produced by a powder molding method which is disclosed in, for example, JP-A-5-473, or bonding a molded article of the thermoplastic elastomer composition of the present invention and a foamed molded article, which are separately produced, with an adhesive.

In the case of the production by a powder molding method, the layer of the thermoplastic elastomer composition of the present invention containing no foaming agent is formed on a mold surface of a mold for powder molding according to the above-described method. Then, the powder of a composition containing a foaming agent and a thermoplastic resin (or a thermoplastic elastomer) on the layer of the thermoplastic elastomer composition, and the powder particles are fused together to form a new layer. After that, the layer of the composition containing the foaming agent is foamed to obtain a two-layer molded article.

A composite molded article having a structure consisting of a non-foamed layer, a foamed layer and a non-foamed layer can be produced by an analogous method to the above method. In this case, two non-foamed layers may be the same or different.

Foaming agents used in the production of such two-ply molded articles and composite molded articles may be the same heat-decomposable foaming agents as those used in the above.

Examples of a thermoplastic resin or elastomer to be contained in the composition which contains a foaming agent are vinyl chloride resins, polyolefin resins, olefinic thermoplastic elastomers and the like. A polyethylene-based foamable composition, which is disclosed in JP-A-7-228720, may be used as the above-described composition containing a foaming agent.

The above foamed layer may comprise a polyurethane foam. In this case, it is preferable to increase adhesion properties between the layer of the thermoplastic elastomer composition of the present invention and the polyurethane layer by pretreating the surface of the thermoplastic elastomer composition of the present invention with a primer such as chlorinated polyethylene, since the adhesion properties between the thermoplastic elastomer composition of the present invention and polyurethane are usually not good.

The layer of a polyurethane foam can be formed by, for example, supplying a mixed liquid of a polyol, a polyisocyanate and a foaming agent between the molded article of the thermoplastic elastomer composition of the present invention and a resin core material which will be explained below, and foaming the mixed liquid.

The molded article consisting of the thermoplastic elastomer composition of the present invention, or the composite molded article comprising the layer of the thermoplastic elastomer composition of the present invention and the foam layer can be used as a skin material for a resin molded article (a resin core material) to produce a multilayer molded article.

For example, the sheet of the thermoplastic elastomer composition of the present invention (a skin material) is laminated on the resin core material to form a two-layer molded article. Furthermore, the two-layer molded article consisting of the layer of the thermoplastic elastomer composition of the present invention and the foam layer (a two-layer skin material) is laminated on a core material with the foam layer facing the core material to form a three-layer molded article.

Examples of the resins which constitute the core materials are thermoplastic resins such as polyolefin (e.g. polyethylene, polypropylene, etc.), and ABS resins (e.g. acrylonitrile-butadiene-styrene copolymer resins, etc.). Among them, polyolefin resins such as polypropylene are preferable.

The multilayer molded articles can be produced by supplying a molten resin on one side of a skin material and pressurizing them. The pressurization may be started after the completion of the resin supply. Alternatively, the pressurizatio n may be started before the completion of the resin supply and continued after the completion of the resin supply. The pressurization may be effected by closing molds of a molding machine, or the supplying pressure of the resin.

For the production of multilayer molded articles, molding methods such as injection molding, low pressure injection molding, low pressure compression molding, and the like can be employed. For example, a molding machine comprising a pair of first and second molds which freely move between an open position and closed position relatively is used, and a skin material comprising the layer of the thermoplastic elastomer composition of the present invention is supplied into between the first and second molds which are in the open position. Then, a molten resin is supplied in-between the skin material and one of the molds. After or during the supply of the resin, the first and second molds are relatively moved to pressurize the skin material and resin to produce a multilayer molded article.

When a skin material comprising the layer of the thermoplastic elastomer composition of the present invention and a foam layer is used in the above production method, a molten resin is supplied in-between the foam layer of the skin material and the mold which faces the foam layer.

In the above production method, a molten resin can be supplied through a resin conduit which is provided in the wall of one mold. Alternatively, a resin supplying nozzle of a resin supplying apparatus, which is placed outside a molding machine, is inserted in a skin material and one mold, and a molten resin is supplied through the nozzle. Then, the nozzle is pulled back from the molds.

The moving directions of the first and second molds are not limited. They can be moved vertically or horizontally.

The above-described methods are more preferable than an injection molding method in which a molten thermoplastic resin is supplied in-between the first and second molds which are in the closed position, since the former methods can prevent the displacement of a skin material and also avoid the damage of a skin material in comparison with the injection molding method.

When a skin material which is produced by the above-mentioned powder molding method is used, a mold used in the powder molding method can be used as a mold for the production of a multilayer molded article. In such as case, a mold for powder molding, which carries a skin material formed by the powder molding method on the mold surface, is attached to the above first mold. Then, the same steps as those described above are carried out to produce a multilayer molded article. This method can produce multilayer molded articles without damaging decorations which have been formed on the surface of the skin material by the powder molding.

The above pair of molds may be, for example, a pair of male and female mold halves which can move with the outer peripheral surface of the first mold half and the inner wall surface of the second mold half being in slidingly contact each other. In this case, when a clearance between the above outer peripheral surface and the above inner wall surface is substantially the same as the thickness of a skin material, a multilayer molded article having the marginal portion of the skin material around the article edges can be produced. When the marginal portion of the skin material is folded back onto the back side of the multilayer molded article, the molded article the edges of which are covered with the skin material can be obtained.

Effects of the Invention

The thermoplastic elastomer composition of the present invention can provide molded articles which have excellent flexibility and are not easily whitened when they are bent.

EXAMPLES

The present invention will be explained in more detail by the following examples, which do not limit the scope of the invention in any way.

Evaluation methods

[1] Complex dynamic viscosity $\eta^*(1)$

A storage viscoelasticity G' (1) and a loss viscoelasticity G" (1) of a sample were measured using a dynamic analyzer (RDS-7700 manufactured by Rheometrix) with a parallel plate mode, at an applied strain of 5%, a sample temperature of 250° C. and a frequency ω of 1 radian/sec., and $\eta^*(1)$ was calculated from the measured storage and loss viscoelasticities according to the above formula (1).

[2] Newtonian viscosity index n $\eta^*(100)$ was measured with the same sample as that used in the measurement of $\eta^*(1)$ in the same manner as in the measurement of $\eta^*(1)$ except that a frequency o applied in the measurement of storage and loss viscoelasticities was changed to 100 radian/sec.

Then, a Newtonian viscosity index n was calculated from the calculated $\eta^*(1)$ and $\eta^*(100)$ according to the above formula (2).

[3] Content of 1-butene units in ethylene-1-butene copolymers (1) Construction of a calibration curve Each of five mixtures of an ethylene-propylene copolymer (containing 73 wt. % of ethylene units) and polybutene-1 in given ratios was heat pressed at 150° C. to form a film having a thickness of 0.05 mm. With each film, an absorbance ratio of a peak assigned to the ethylene units (wave number of 720 $cm^{-1}$) to a peak assigned to the 1-butene units (wave number of 772 $cm^{-1}$) was measured using an infrared spectrometer, and ratios-of the 1-butene unit content to the total content of the ethylene and 1-butene units of the five mixtures were plotted in a graph with such ratios on the abscissa and the absorbance ratios on the ordinate, and a calibration curve was drawn.

The mixtures of the ethylene-propylene copolymer and polybutene-1 were prepared by dissolving both polymers in toluene in a single vessel, adding methanol to the solution to precipitate the polymers, recovering the precipitated polymer mixture and then drying it.

(2) Measurement of a 1-butene unit content

An ethylene-1-butene copolymer rubber was heated to a temperature higher than its melting point and pressed to form a film having a thickness of 0.05 mm. With this film, an absorbance ratio of a peak assigned to the ethylene units to a peak assigned to the 1-butene units was measured using an infrared spectrometer, and a 1-butene unit content in the ethylene-1-butene copolymer rubber was read from the calibration curve.

[4] Content of 1-hexene units in an ethylene-1-hexene copolymer rubber

An ethylene-1-hexene copolymer rubber was heat pressed at 150° C. to form a film having a thickness of 0.05 mm. With this film, an absorbance at a peak assigned to the terminal methyl groups on the n-butyl branches in the 1-hexene units was measured using an infrared spectrometer, and then a ratio of the number of the terminal methyl groups on the n-butyl branches to the number of carbon atoms in the backbone of the ethylene-1-hexene copolymer rubber, that is, the degree of branching, was calculated. From this degree of branching, the number of branched monomer units and the number of unbranched monomer units were calculated, and then a 1-hexene unit content (wt. %) was calculated from these numbers.

A degree of branching was calculated according to the following formula:

$$\text{Degree of branching (\%)} = [(f \times A)/(t \times d)] \times 100$$

wherein f is a coefficient (0.070 $cm^2/g$), A is an absorbance, t is a film thickness (cm), and d is the density ($g/cm^3$) of an ethylene-1-hexene copolymer rubber.

The coefficient f is cited from Usami, Takayama, et al. op. cit.

[5] Sphere-converted average particle size of a thermoplastic elastomer composition One hundred particles of a thermoplastic elastomer composition were randomly sampled and their total weight was weighed. Then, an average volume per one particle was calculated from the total weight and the specific gravity of the thermoplastic elastomer composition, and a diameter of a sphere having the same volume as the average volume was calculated, and used as the sphere-converted average particle size of the powder of the thermoplastic elastomer composition.

[6] Bulk specific gravity of powder of a thermoplastic elastomer composition

The bulk specific gravity of the powder of a thermoplastic elastomer composition was measured according to JIS K-6721.

[7] Appearance of a molded article

Figure 3:
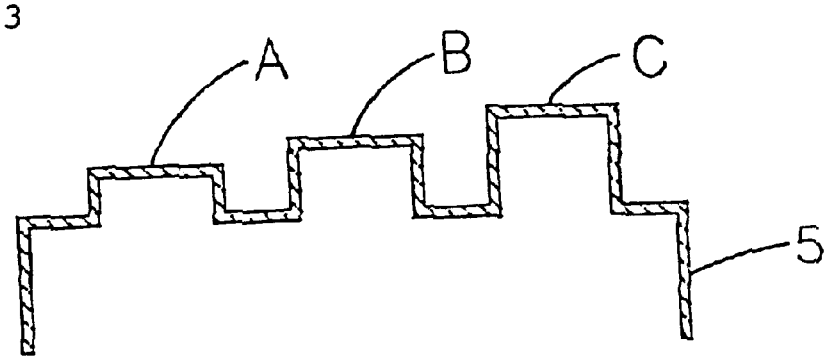
FIG. 3 is a cross section of a molded article produced using the mold of FIG. 2.

With an obtained molded article, the presence of pinholes and underfills was visually observed at edges of projections A (height: 7 mm, width: 5 mm), B (height: 11 mm, width: 25 mm) and C (height: 15 mm, width: 25 mm) shown in FIG. 3, and evaluated according to the following criteria:

++: Neither pinholes nor underfills were observed on any edges of the projections A, B and C.

+: Neither pinholes nor underfills were observed on any edges of the projections A and B, but pinholes or underfills were observed on the edges of the projection C.

−: Neither pinholes nor underfills were observed on any edges of the projection A, but pinholes or underfills were observed on the edges of the projections B and C.

−−: Pinholes or underfills were observed on all the edges of the projections A, B and C.

[8] Whitening in the bending test of a molded article

A molded article was bent along its center line, and a load of 500 gf or 1 kgf was applied to the bent article for one minute. Then, the load was removed, and the whitened state of the bent portion of the molded article was visually observed and evaluated according to the following criteria:

+: Whitening was scarcely observed.

−: Whitening was slightly observed.

−−: Remarkable whitening was observed.

[9] Hardness of a molded article

A molded article was cut into pieces each having sizes of 1 cm×5 cm, and ten pieces were laminated. Then, Shore A hardness of the laminate was measured with a durometer-Shore A hadness meter.

Reference Example 1

An oil extended EPDM (ESPREN E670F manufactured by Sumitomo Chemical Co., Ltd.) (50 wt. parts), which comprises EPDM (content of propylene units=28 wt. %; iodine value=12; $ML_{1+4}$ (100° C.)=242) and a mineral oil-based softener (DIANAPROCESS PW-380 manufactured by IDEMITSU KOSAN Co., Ltd.) in a weight ratio of 1:1 and has $ML_{1+4}$ (100° C.) of 53, a propylene-ethylene random copolymer resin (content of ethylene units=5 wt. %; MFR=90 g/10 min.) (50 wt. part), and a crosslinking aid (SUMIFINE BM, a bismaleimide compound manufactured by Sumitomo Chemical Co., Ltd.) (0.4 wt. part) were kneaded with a Banbury mixer for 10 minutes, and pelletized with an extruder and a pelletizer to obtain pellets having a diameter of 3 mm and a length of 6 mm.

The pellets (100 wt. parts) and 2,3-dimethyl-2,5-di(tert.-butylperoxyno)hexane (SUNPEROX APO manufactured by SANKEN KAKO KABUSHIKIKAISHA) (0.1 wt. part) were kneaded and dynamic crosslinked at 230° C. with a twin-screw extruder to obtain a composition having $\eta^*(1)$ of $5.2\times10^3$ poises and n of 0.31. Then, the composition was extruded from the twin-screw extruder and pelletized with a pelletizer to obtain pellets having a diameter of 3 mm and a length of 6 mm.

Reference Example 2

Absolute toluene (1 liter) was charged in a 2 liter separable flask which had been filled with nitrogen gas. Then, the flask was heated to 30° C. while supplying a mixed gas of ethylene and 1-butene into the flask at an ethylene supply rate of 9 NL/min. and a 1-butene supply rate of 2.5 NL/min. After that, triisobutyl aluminum (0.25 g, 1.25 mmol) was added at 30° C. while supplying the above mixed gas and stirring, and then (tert.-butylamide)dimethyl(tetramethyl-$\eta^5$-cyclopentadienyl)silanetitanium cichloride (0.018 g, 0.005 mmol), which had been prepared according to the disclosure of JP-A-3-163088, was added.

The obtained mixture was stirred at 30° C. for15 minutes while supplying the above mixed gas, and then triphenylcarbeniumtetrakis(pentafluorophenyl)borane (0.0023 g, 0.025 mmol) was added, followed by further stirring at 30° C. for 30 minutes while supplying the above mixed gas.

Thereafter, methanol (20 ml) was added to terminate the polymerization, and the obtained mixture was poured into methanol (10 liters). The precipitate was collected by filtration and dried at 80° C. for 12 hours under reduced pressure to obtain an ethylene-1-butene copolymer rubber (156 g). The results of the evaluation of this ethylene-1-butene copolymer rubber are shown in Table 1.

Reference Examples 3–6

An ethylene-1-butene copolymer rubber was prepared in the same manner as in Reference Example 2 except that a supply rate of 1-butene gas, a polymerization temperature and a polymerization time were changed as shown in Table 1. The results of the evaluation of each ethylene-1-butene copolymer rubber are shown in Table 1.

Reference Example 7

Absolute toluene (1 liter) was charged in a 2 liter separable flask which had been filled with nitrogen gas, and an ethylene gas under atmospheric pressure was supplied at a rate of 2 NL/min. while maintaining the content in the flask at 0° C. Then, 1-hexene (126.2 g, 1.5 mol) and triisobutyl aluminum (0.25 g, 1.25 mmol) were added to the mixture, and further (tert.-butylamide)dimethyl(tetramethyl-$\eta^5$-cyclopentadienyl) silanetitanium dichloride (0.018 g, 0.005 mmol), which had been prepared according to the disclosure of JP-A-3-163088, was added, while stirring at 0° C. After that, triphenylcarbeniumtetrakis(pentafluorophenyl)borane (0.0023 g, 0.025 mmol) was added, followed by further stirring at 0° C. for 5 minutes while supplying the ethylene gas.

Thereafter, methanol (20 ml) was added to terminate the polymerization, and the obtained mixture was poured into methanol (10 liters). The precipitate was collected by filtration and dried at 80° C. for 12 hours under reduced pressure to obtain an ethylene-1-hexene copolymer rubber (119 g). The results of the evaluation of this ethylene-1-butene copolymer rubber are shown in Table 1.

TABLE 1

|  | Ref. Ex. 2 | Ref. Ex. 3 | Ref. Ex. 4 | Ref. Ex. 5 | Ref. Ex. 6 | Ref. Ex. 7 |
|---|---|---|---|---|---|---|
| Supply rate of 1-butene (NL/min.) | 2.5 | 3.2 | 4.5 | 1.8 | 1.4 | — |
| Polymerization temp. (° C.) | 30 | 28 | 24 | 36 | 36 | 0 |
| Polymerization time (min.) | 30 | 30 | 30 | 30 | 30 | 5 |
| 1-Butene unit content (wt. %) | 60 | 71 | 88 | 40 | 46 | 0 |
| 1-Hexene unit content (wt. %) | 0 | 0 | 0 | 0 | 0 | 70 |
| $\eta^*(1)$ (poises) | $1.2 \times 10^4$ | $2.2 \times 10^3$ | $1.3 \times 10^3$ | $7.4 \times 10^3$ | $5.1 \times 10^3$ | $2 \times 10^2$ |
| n | 0.30 | 0.20 | 0.20 | 0.30 | 0.22 | 0.05 |

Example 1

The composition prepared in Reference Example 1 (100 wt. parts) and the ethylene-1-butene copolymer rubber prepared in Reference Example 2 (5 wt. parts) were kneaded with a twin-screw kneader at 190° C. to obtain the molten mixture of a thermoplastic elastomer composition.

The molten mixture was press molded to obtain a sheet having a thickness of 1 mm.

The results of the evaluation of the thermoplastic elastomer composition which was molded, and the produced sheet are shown in Table 2.

Example 2

A thermoplastic elastomer composition and a sheet were produced in the same manners as in Example 1 except that the amount of the ethylene-1-butene copolymer rubber was changed to 10 wt. parts.

The results of the evaluation of the thermoplastic elastomer composition, and the produced sheet are shown in Table 2.

Example 3

A thermoplastic elastomer composition and a sheet were produced in the same manners as in Example 1 except that the amount of the ethylene-1-butene copolymer rubber was changed to 20 wt. parts.

The results of the evaluation of the thermoplastic elastomer composition, and the produced sheet are shown in Table 2.

Example 4

A thermoplastic elastomer composition and a sheet were produced in the same manners as in Example 1 except that the ethylene-1-butene copolymer rubber prepared in Reference Example 3 (10 wt. parts) was used in place of the ethylene-1-butene copolymer rubber which was prepared in Reference Example 2 (5 wt. parts).

The results of the evaluation of the thermoplastic elastomer composition, and the produced sheet are shown in Table 2.

Example 5

A thermoplastic elastomer composition and a sheet were produced in the same manners as in Example 4 except that the amount of the ethylene-1-butene copolymer rubber prepared in Reference Example 3 was changed to 20 wt. parts.

The results of the evaluation of the thermoplastic elastomer composition, and the produced sheet are shown in Table 2.

Example 6

A thermoplastic elastomer composition and a sheet were produced in the same manners as in Example 1 except that the ethylene-1-butene copolymer rubber prepared in Reference Example 4 (10 wt. parts) was used in place of the ethylene-1-butene copolymer rubber which was prepared in Reference Example 2 (5 wt. parts).

The results of the evaluation of the thermoplastic elastomer composition, and the produced sheet are shown in Table 2.

Example 7

A thermoplastic elastomer composition and a sheet were produced in the same manners as in Example 6 except that the amount of the ethylene-1-butene copolymer rubber prepared in Reference Example 4 was changed to 20 wt. parts.

The results of the evaluation of the thermoplastic elastomer composition, and the produced sheet are shown in Table 2.

Comparative Example 1

A thermoplastic elastomer composition and a sheet were produced in the same manners as in Example 1 except that the ethylene-1-butene copolymer rubber prepared in Reference Example 5 (10 wt. parts) was used in place of the ethylene-1-butene copolymer rubber which was prepared in Reference Example 2 (5 wt. parts).

The results of the evaluation of the thermoplastic elastomer composition, and the produced sheet are shown in Table 2.

Comparative Example 2

A thermoplastic elastomer composition and a sheet were produced in the same manners as in Example 1 except that the ethylene-1-butene copolymer rubber prepared in Reference Example 6 (10 wt. parts) was used in place of the ethylene-1-butene copolymer rubber which was prepared in Reference Example 2 (5 wt. parts).

The results of the evaluation of the thermoplastic elastomer composition, and the produced sheet are shown in Table 2.

Comparative Example 3

A thermoplastic elastomer composition and a sheet were produced in the same manner as in Example 6 except that the ethylene-1-butene copolymer rubber prepared in Reference Example 6 (20 wt. parts) was used.

The results of the evaluation of the thermoplastic elastomer composition, and the produced sheet are shown in Table 2.

Example 8

A propylene-ethylene random copolymer resin (ethylene unit content=4.5 wt. %, MFR=228 g/10 min.) (66.7 wt. parts) and an ethylene-propylene copolymer rubber (ESPREN V0141 manufactured by Sumitomo Chemical Co., Ltd.; propylene unit content=27 wt. %, MFR=0.7 g/10 min.) (33.3 wt. parts) were kneaded with a twin-screw kneader at a shear rate of $1.2 \times 10^3$ sec.$^{-1}$ at 220° C. to obtain a composition having $\eta^*(1)$ of $1.8 \times 10^3$ poises and n of 0.12.

The obtained composition (100 wt. parts) and the ethylene-1-butene copolymer rubber prepared in Reference Example 3 (66.7 wt. parts) were kneaded with a twin-screw kneader at 190° C. to obtain a molten thermoplastic elastomer composition. Then, the composition was press molded to obtain a sheet having a thickness of 1 mm.

The results of the evaluation of the thermoplastic elastomer composition, and the produced sheet are shown in Table 2.

TABLE 2

| | Ethylene-1-butene copolymer rubber | | Thermoplastic elastomer composition | | Whitening in the bending test of molded article | |
|---|---|---|---|---|---|---|
| | 1-Butene unit content | Amount*[1] | | | | |
| | (wt. %) | (wt. parts) | $\eta^*(1)$ | n | 500 kgf | 1 kgf |
| Ex. 1 | 60 | 10 | $3.1 \times 10^3$ | 0.21 | − | + |
| Ex. 2 | 60 | 20 | $3.0 \times 10^3$ | 0.21 | − | + |
| Ex. 3 | 60 | 40 | $3.1 \times 10^3$ | 0.21 | + | + |
| Ex. 4 | 71 | 20 | $4.3 \times 10^3$ | 0.27 | + | + |
| Ex. 5 | 71 | 40 | $2.1 \times 10^3$ | 0.17 | + | + |
| Ex. 6 | 88 | 20 | $3.0 \times 10^3$ | 0.24 | + | + |
| Ex. 7 | 88 | 40 | $3.0 \times 10^3$ | 0.24 | + | + |
| C. Ex. 1 | 40 | 20 | $1.3 \times 10^4$ | 0.45 | — | — |
| C. Ex. 2 | 46 | 20 | $1.0 \times 10^4$ | 0.40 | — | — |
| C. Ex. 3 | 46 | 40 | $1.2 \times 10^4$ | 0.45 | — | — |
| Ex. 8 | 71 | 100 | $1.9 \times 10^3$ | 0.14 | + | + |

Note:
[1])An amount per 100 wt. parts of the ethylene-propylene random copolymer resin.

Example 9

A molten thermoplastic elastomer composition was prepared in the same manner as in Example 3, and pelletized with a pelletizer to obtain pellets having a diameter of 3 mm and a length of 6 mm. The pellets were cooled to −120° C. and comminuted with a freeze-grinder to obtain the powder of the thermoplastic elastomer composition. The powder had a sphere-converted average particle size of 0.20 mm, and a bulk specific gravity of 0.32.

A nickel-electroformed mold (30 mm×30 mm, thickness of 3 mm) having a grain pattern on a mold surface was heated at 250° C., and the above powder (1 kg) was poured onto the mold surface. After 14 seconds, unfused powder was removed, and the mold carrying the fused thermoplastic elastomer composition was heated in a heating furnace kept at 250° for 60 seconds. Then, the mold was pulled out from the heater and cooled, and the shaped molded article was removed from the mold.

The molded article had a uniform thickness and no pinholes.

The results of the evaluation of the molded article are shown in Table 3.

Example 10

A thermoplastic elastomer composition and a sheet were produced in the same manners as in Example 9 except that the etylene-1-hexene copolymer rubber prepared in Reference Example 7 was used in place of the ethylene-1-butene copolymer rubber prepared in Reference Example 2.

The results of the evaluation of the thermoplastic elastomer composition and the sheet are shown in Table 3.

The thermoplastic elastomer composition had $\eta^*(1)$ of $1.2 \times 10^3$ poises and n of 0.15.

TABLE 3

| | Ethylene-α-olefin copolymer rubber | | | Whitening in the bending test of molded article | |
|---|---|---|---|---|---|
| | | α-Olefin unit content | Amount*[1] | | |
| | α-Olefin | (wt. %) | (wt. parts) | 500 gf | 1 kgf |
| Ex. 9 | 1-Butene | 60 | 40 | + | + |
| Ex. 10 | 1-Hexene | 70 | 40 | + | + |

Note:
[1])An amount per 100 wt. parts of the ethylene-propylene random copolymer resin.

Example 11

A propylene-ethylene random copolymer resin (ethylene unit content=4.5 wt. %, MFR=228 g/10 min.) (100 wt. parts) and an ethylene-1-butene copolymer rubber (1-butene unit content=71 wt. %, $\eta^*(1)=2.2 \times 10^3$ poises, n=0.2) (50 wt. parts) were kneaded with a twin-screw kneader at 190° C. to obtain a thermoplastic elastomer composition having $\eta^*(1)$ of $1.4 \times 10^3$ poises and n of 0.13.

This composition was cooled to −100° C. with liquid nitrogen, and comminuted with a freeze-grinder to obtain the powder of the thermoplastic elastomer composition. The powder had a sphere-converted average particle size of 0.20 mm, and a bulk specific gravity of 0.33.

A nickel-electroformed mold (30 mm×30 mm, thickness of 3 mm) having a grain pattern on a mold surface was heated at 250° C., and the above powder (1 kg) was poured onto the mold surface. After 14 seconds, unfused powder was removed, and the mold carrying the fused thermoplastic elastomer composition was heated in a heating furnace kept at 250° for 60 seconds. Then, the mold was pulled out from the heater and cooled, and the shaped molded article was removed from the mold.

The results of the evaluation of the molded article are shown in Table 4.

Example 12

A thermoplastic elastomer composition having $\eta^*(1)$ of $5 \times 10^3$ poises and n of 0.18 was prepared in the same manner as in Example 11 except that 200 wt. parts of the ethylene-1-butene copolymer rubber was used. The powder of this composition was prepared and then a molded article was produced in the same manners as in Example 11.

The results of the evaluation of the molded article are shown in Table 4.

Example 13

A thermoplastic elastomer composition having $\eta^*(1)$ of $3 \times 10^3$ poises and n of 0.04 was prepared in the same manner as in Example 11 except that 100 wt. parts of an ethylene-1-hexene copolymer rubber (1-hexene unit content=70 wt. %, η*(1)=2×10² poises, n=0.03) was used. The powder of this composition was prepared and then a molded article was produced in the same manners as in Example 11.

The results of the evaluation of the molded article are shown in Table 4.

Comparative Example 4

An oil extended EPDM (ESPREN E670F manufactured by Sumitomo Chemical Co., Ltd.) (50 wt. parts), which comprises EPDM (content of propylene units=28 wt. %; iodine value=12; $ML_{1+4}(100°\ C.)=242$) and a mineral oil-based softener (DIANAPROCESS PW-380 manufactured by IDEMITSU KOSAN Co., Ltd.) in a weight ratio of 1:1 and has $ML_{1+4}(100°\ C.)$ of 53, a propylene-ethylene random copolymer resin (content of ethylene units=4.5 wt. %; MFR=90 g/10 min.) (50 wt. part), and a crosslinking aid (SUMIFINE BM, a bismaleimide compound manufactured by Sumitomo Chemical Co., Ltd.) (0.6 wt. part) were kneaded with a Banbury mixer for 10 minutes, and pelletized with an extruder and a pelletizer to obtain pellets having a diameter of 3 mm and a length of 6 mm).

The pellets (100 wt. parts) and 2,3-dimethyl-2,5-di(tert.-butylperoxyno)hexane (SUNPEROX APO manufactured by SANKEN KAKO KABUSHIKIKAISHA) (0.4 wt. part) were kneaded and dynamic crosslinked at 200° C. and a shear rate of $1.2\times10^3\ sec.^{-1}$ with a twin-screw extruder to obtain a composition having η*(1) of $1.5\times10^3$ poises and n of 0.25. Then, the composition was cooled to −120° C. with liquid nitrogen, and comminuted with a freeze-grinder to obtain a powder having a sphere-converted average particle size of 0.20 mm and a bulk specific gravity of 0.30.

A molded article was produced in the same manner as in Example 11 except that the above obtained powder was used.

The results of the evaluation of the molded article are shown in Table 4.

TABLE 4

|  | Whitening in the bending test of molded article | | Shore A hardness of molded article |
| --- | --- | --- | --- |
|  | 500 gf | 1 kgf |  |
| Ex. 11 | + | + | 90 |
| Ex. 12 | + | + | 81 |
| Ex. 13 | + | + | 81 |
| C. Ex. 4 | — | — | 92 |

Example 14

<Preparation of the powder of a thermoplastic elastomer composition>

The pellets of a composition which was prepared in the same manner as in Comparative Example 4 (100 wt. parts) and an ethylene-1-butene copolymer rubber (1-butene unit content=71 wt. %, η*(1)=2.2×10³ poises, n=0.2) (10 wt. parts) were supplied in an extruder having a diameter of 30 mm and kneaded at 160° C. The formed thermoplastic elastomer composition was extruded through a die having a discharging opening diameter of 1.0 mm at a discharging rate of 1 kg/hr. per one discharging opening, and the extruded composition was hauled off at a rate of 32 m/min. and then cooled to obtain strands having a diameter of 0.8 mm. The strands were cut with a pelletizer to obtain a powder having a sphere-converted average particle size of 0.91 mm and a bulk specific gravity of 0.465.

The thermoplastic elastomer composition obtained by kneading had η*(1) of 1.7×10³ poises and n of 0.21.

<Production of a molded article by powder slush molding>

The above obtained powder was power slush molded with a molding machine, the schematic view of which is shown in FIG. 1.

Firstly, the powder (3) was supplied into a container (2). Next, the container (2) and a mold (1) were mated and fixed so that the peripheries of the openings of the container and mold were in close contact with each other.

Figure 2:
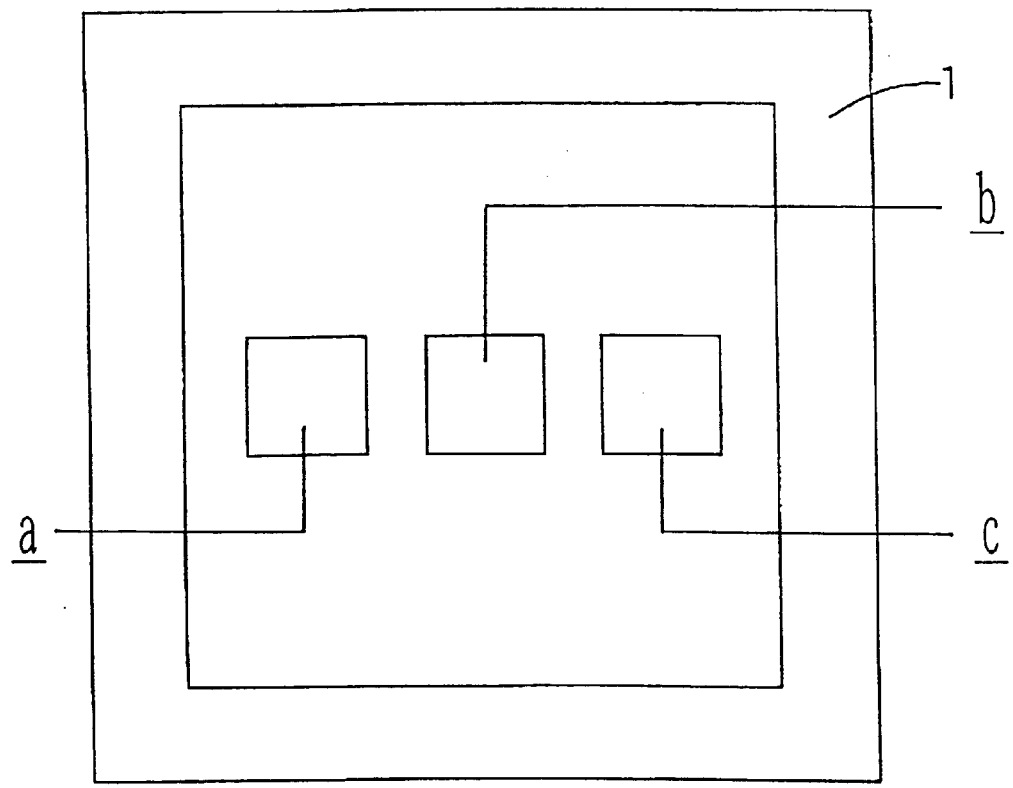
FIG. 2 is a plane view on the mold surface side of a mold for powder slush molding.

The mold (1) had, on its mold surface, three depressions as shown in FIG. 2, that is a depression "a" having a depth of 7 mm, a depression "b" having a depth of 11 mm, and a depression "c" having a depth of 15 mm. The opening of each depression was a square having a side length of 25 mm. The whole mold surface of the mold (1) had a grain pattern. The temperature of the mold (1) was 250° C.

Immediately after fixing the container (2) and the mold (1), they were rotated with a single-axis rotating apparatus by 180 degrees around a rotation axis (4) to supply the powder (3) onto the mold surface of the mold (1). Then, the fixed container (2) and mold (1) were oscillated twice at an amplitude of 45 degrees around the rotation axis (4) over 15 seconds to melt the powder (3) and adhere the molten powder (3) to the mold surface of the mold (1). After that, the fixed container (2) and mold (1) were again rotated by 180 degrees so that they returned to the original position, and a portion of the powder (3) which was not adhered to the mold surface of the mold (1) was recovered to the container (2).

Thereafter, the mold (1) to which the fused powder (3) was adhered was detached from the container (2), heated in an oven at 250° C. for 2 minutes, and cooled. Then, the molded article (5) was removed from the mold (1).

The obtained molded article (5) had a thickness of 1.2 mm and three projections, that is, the projection A having a height of 7 mm, the projection B having a height of 11 mm, and the projection C having a height of 15 mm. The root portion of each projection was a square having a side length of 25 mm.

The grain pattern formed on the mold surface of the mold (1) was exactly transferred to the surface of the molded article which was in contact with the mold surface of the mold (1). The cross section of this molded article is shown in FIG. 3.

The results of the evaluation of the powder and the molded article are shown in Table 5.

Example 15

A molded article was produced in the same manner as in Example 14 except that, in the production of the powder of the thermoplastic elastomer composition, the discharging rate of the composition from the die was changed to 0.8 kg/hr., and the haul-off rate was changed to 35 m/min. The powder used for the production of the molded article had a sphere-converted average particle size of 0.94 mm, and a bulk specific gravity of 0.460.

The results of the evaluation of the molded article are shown in Table 5.

Example 16

A molded article was produced in the same manner as in Example 14 except that, in the production of the powder of the thermoplastic elastomer composition, the haul-off rate was changed to 14 m/min. The powder used for the production of the molded article had a sphere-converted average particle size of 1.25 mm, and a bulk specific gravity of 0.470.

The results of the evaluation of the molded article are shown in Table 5.

Example 17

A molded article was produced in the same manner as in Example 14 except that an ethylene-1-hexene copolymer rubber (1-hexene unit content=70 wt. %, $\eta^*(1)=1\times10^2$ poises, n=0.03) was used. The powder used for the production of the molded article had a sphere-converted average particle size of 0.92 mm, and a bulk specific gravity of 0.460. The thermoplastic elastomer composition constituting the powder had $\eta^*$ of $1.2\times10^3$ poises and n of 0.15.

The results of the evaluation of the molded article are shown in Table 5.

Example 18

The pellets of a kneaded mixture, which was prepared in the same manner as in Comparative Example 4 (100 wt. parts), and an ethylene-1-butene copolymer rubber (1-butene unit content=71 wt. %, $\eta^*(1)=2.2\times10^3$ poises, n=0.2) (10 wt. parts) were supplied into a twin-screw extruder and kneaded at 200° C. Then, the formed thermoplastic elastomer composition was extruded from the extruder, and cut with a cutter to obtain pellets. The thermoplastic elastomer composition had $\eta^*(1)$ of $1.7\times10^3$ poises and n of 0.21.

The pellets of the thermoplastic elastomer composition were cooled to –100° C. with liquid nitrogen, and comminuted to obtain a powder which passed through the 32 mesh (opening: 500 $\mu$m×500 $\mu$m) of the Tyler standard sieve. The powder had a sphere-converted average particle size of 0.20 mm and a bulk specific gravity of 0.290.

A molded article was produced in the same manner as in Example 14 except that the above powder was used.

The results of the evaluation of the powder and the molded article are shown in Table 5.

Example 19

A composition prepared in the same manner as in Example 8 (100 wt. parts), and an ethylene-1-butene copolymer rubber (1-butene unit content=71 wt. %; $\eta^*(1)=2.2\times10^3$ poises; n=0.2) (66.7 wt. parts) were supplied into an extruder having a diameter of 30 mm and kneaded at 160° C. The formed thermoplastic elastomer composition was extruded through a die having a discharging opening diameter of 1.0 mm at a discharging rate of 0.8 kg/hr. per one discharging opening, and the extruded composition was hauled off at a rate of 35 m/min. and then cooled to obtain strands having a diameter of 0.8 mm. The strands were cut with a pelletizer to obtain a powder having a sphere-converted average particle size of 0.88 mm and a bulk specific gravity of 0.460.

The thermoplastic elastomer composition obtained by kneading had $\eta^*(1)$ of $2\times10^3$ poises and n of 0.14.

Then, a molded article was produced in the same manner as in Example 14 except that the above powder was used.

The results of the evaluation of the powder and the molded article are shown in Table 5.

Comparative Example 5

A kneaded composition prepared in the same manner as in Comparative Example 4 (100 wt. parts) was supplied into an extruder having a diameter of 30 mm and kneaded at 160° C. Then, the composition was extruded through a die having a discharging opening diameter of 1.0 mm at a discharging rate of 1 kg/hr. per one discharging opening, and the extruded composition was hauled off at a rate of 32 m/min. and then cooled to obtain strands having a diameter of 0.8 mm. The strands were cut with a pelletizer to obtain a powder having a sphere-converted average particle size of 0.90 mm and a bulk specific gravity of 0.450.

Then, a molded article was produced in the same manner as in Example 14 except that the above powder was used.

The results of the evaluation of the powder and the molded article are shown in Table 5.

Comparative Example 6

The pellets of a kneaded composition, which was prepared in the same manner as in Comparative Example 4, were cooled to –100° C. with liquid nitrogen, and comminuted to obtain a powder which passed through the 32 mesh of the Tyler standard sieve. The powder had a sphere-converted average particle size of 0.18 mm and a bulk specific gravity of 0.293.

A molded article was produced in the same manner as in Example 14 except that the above powder was used.

The results of the evaluation of the powder and the molded article are shown in Table 5.

TABLE 5

| | Discharging rate (kg/hr.) | Haul-off rate (m/min.) | Sphere-converted average particle size (mm) | Bulk specific gravity | Appearance of molded article | Hardness of molded article | Whitening in the bending test of molded article | |
|---|---|---|---|---|---|---|---|---|
| | | | | | | | 500 gf | 1 kgf |
| Ex. 14 | 1 | 32 | 0.91 | 0.465 | ++ | 88 | + | + |
| Ex. 15 | 0.8 | 35 | 0.94 | 0.460 | ++ | 88 | + | + |
| Ex. 16 | 1 | 32 | 0.92 | 0.460 | ++ | 88 | + | + |
| Ex. 17 | 1 | 14 | 1.25 | 0.470 | – | 88 | + | + |
| Ex. 18 | — | — | 0.20 | 0.290 | – | 88 | + | + |
| Ex. 19 | 0.8 | 35 | 0.88 | 0.460 | ++ | 84 | + | + |
| C. Ex. 5 | 0.8 | 30 | 0.90 | 0.450 | – | 92 | –– | –– |
| C. Ex. 6 | — | — | 0.18 | 0.293 | – | 92 | –– | –– |

Example 20

<Preparation of the powder of a thermoplastic elastomer composition>

A propylene-ethylene random copolymer (ethylene unit content=4.5 wt. %; MFR=228 g/10 min.) (100 wt. parts) and an ethylene-1-butene copolymer rubber (1-butene unit content=71 wt. %) (100 wt. parts) were supplied into an extruder having a diameter of 30 mm and kneaded at 160° C. The formed thermoplastic elastomer composition was extruded through a die having a discharging opening diameter of 1.0 mm at a discharging rate of 1 kg/hr. per one discharging opening, and the extruded composition was hauled off at a rate of 32 m/min. and then cooled to obtain strands having a diameter of 0.8 mm. The strands were cut with a pelletizer to obtain a powder having a sphere-converted average diameter of 0.91 mm and a bulk specific gravity of 0.460.

The above thermoplastic elastomer composition had $\eta^*(1)$ of $1.4 \times 10^3$ poises and n of 0.13.

<Production of a molded article by powder slush molding>

A molded article was produced in the same manner as in Example 14 except that the above powder was used.

The results of the evaluation of the molded article are shown in Table 6.

Example 21

The powder of a thermoplastic elastomer composition was prepared in the same manner as in Example 20 except that the amount of the ethylene-1-butene copolymer rubber was changed to 200 wt. parts. This powder had a sphere-converted average particle size of 0.94 mm and a bulk specific gravity of 0.450.

The thermoplastic elastomer composition had $\eta^*(1)$ of $1.8 \times 10^3$ poises and n of 0.15.

A molded article was produced in the same manner as in Example 20 except that the above powder was used.

The results of the evaluation of the molded article are shown in Table 6.

Example 22

A molded article was produced in the same manner as in Example 20 except that an ethylene-1-hexene copolymer rubber (1-hexene unit content=70 wt. %; $\eta^*(1)=2 \times 10^2$ poises; n=0.03) was used in place of the ethylene-1-butene copolymer rubber.

The powder used in the production of the molded article had a sphere-converted average particle size of 0.93 mm and a bulk specific gravity of 0.458, while the thermoplastic elastomer composition constituting the powder had $\eta^*(1)$ of $3 \times 10^2$ poises and n of 0.04.

The results of the evaluation of the molded article are shown in Table 6.

Example 23

The powder of a thermoplastic elastomer composition was prepared in the same manner as in Example 20 except that the haul-off rate of the thermoplastic elastomer composition from the die was changed to 14 m/min.

The powder has a sphere-converted average particle size of 1.25 mm and a bulk specific gravity of 0.450.

A molded article was produced in the same manner as in Example 20 except that the above powder was used.

The results of the evaluation of the molded article are shown in Table 6.

Example 24

A propylene-ethylene random copolymer resin (ethylene unit content=4.5 wt. %; MFR=228 g/10 min.) (100 wt. parts) and an ethylene-1-butene copolymer rubber (1-butene unit content=71 wt. %) (100 wt. parts) were supplied into a twin-screw extruder and kneaded at 200° C. to obtain a thermoplastic elastomer composition having $\eta^*(1)$ of $1.4 \times 10^3$ poises and n of 0.13.

This composition was extruded from the same twin-screw extruder as used in the above step, and cut with a cutter to obtain pellets of the composition having a diameter of 3 mm and a length of 6 mm.

Then, the pellets were cooled to −100° C. with liquid nitrogen and comminuted to obtain a powder which passed through the 32 mesh of the Tyler standard sieve. The powder had a sphere-converted average particle size of 0.20 mm and a bulk specific gravity of 0.270.

A molded article was produced in the same manner as in Example 20 except that the above powder was used.

The results of the evaluation of the molded article are shown in Table 6.

Comparative Example 7

The pellets of a thermoplastic elastomer composition having $\eta^*(1)$ of $1.5 \times 10^3$ poises and n of 0.25 were prepared in the same manner as in Comparative Example 4.

The pellets were supplied into an extruder having a diameter of 30 mm and kneaded at 160° C. The formed thermoplastic elastomer composition was extruded through a die having a discharging opening diameter of 1.0 mm at a discharging rate of 1 kg/hr. per one discharging opening, and the extruded composition was hauled off at a rate of 32 m/min. and then cooled to obtain strands having a diameter of 0.8 mm. The strands were cut with a pelletizer to obtain a powder having a sphere-converted average diameter of 0.91 mm and a bulk specific gravity of 0.450.

A molded article was produced in the same manner as in Example 20 except that the above powder was used.

The results of the evaluation of the molded article are shown in Table 6.

Comparative Example 8

The pellets of a thermoplastic elastomer composition, which was prepared in the same manner as in Comparative Example 7, were cooled to −100° C. and comminuted to obtain a powder which passed through the 32 mesh of the Tyler standard sieve. The powder had a sphere-converted average particle size of 0.18 mm and a bulk specific gravity of 0.293.

A molded article was produced in the same manner as in Example 20 except that the above powder was used.

The results of the evaluation of the molded article are shown in table 6.

TABLE 6

|  | Discharging rate (kg/hr.) | Haul-off rate (m/min.) | Sphere-converted average particle size (mm) | Bulk specific gravity | Appearance of molded article | Hardness of molded article | Whitening in the bending test of molded article 500 gf | Whitening in the bending test of molded article 1 kgf |
|---|---|---|---|---|---|---|---|---|
| Ex. 20 | 1 | 32 | 0.91 | 0.460 | ++ | 88 | + | + |
| Ex. 21 | 1 | 32 | 0.94 | 0.450 | ++ | 81 | + | + |
| Ex. 22 | 1 | 32 | 0.93 | 0.458 | ++ | 87 | + | + |
| Ex. 23 | 1 | 14 | 1.25 | 0.450 | – | 88 | + | + |
| Ex. 24 | — | — | 0.20 | 0.270 | – | 88 | + | + |
| C. Ex. 7 | 0.8 | 30 | 0.91 | 0.450 | ++ | 92 | –– | –– |
| C. Ex. 8 | — | –– | 0.18 | 0.293 | – | 92 | –– | –– |

What is claimed is:

1. A thermoplastic elastomer composition comprising:
   a) 100 wt. parts of a polyolefin resin,
   b) 5 to 250 wt. parts of ethylene-α-olefin copolymer rubber in which the content of the α-olefin units is 60–90 wt. %, wherein the wt. percent is with respect to the weight of the ethylene-α-olefin copolymer rubber, and
   c) 5 to 400 wt. parts of an ethylene-α-olefin copolymer rubber in which the content of the α-olefin units is 5 to 40 wt. %, wherein the wt. % is with respect to the weight of the ethylene-α-olefin copolymer rubber.

2. A thermoplastic elastomer composition according to claim 1, wherein an α-olefin in said ethylene-α-olefin copolymer (b) is an α-olefin having 4 to 8 carbon atoms.

3. A thermoplastic elastomer composition according to claim 1, wherein said ethylene-α-olefin copolymer rubber (b) is an ethylene-1-butene copolymer rubber or an ethylene-1-hexene copolymer rubber.

4. A thermoplastic elastomer composition according to claim 1, wherein said ethylene-α-olefin copolymer rubber (c) is an ethylene-α-olefin-non-conjugated diene copolymer rubber.

5. A thermoplastic elastomer composition according to claim 1, which has a complex dynamic viscosity $\eta^*(1)$ of $1.5 \times 10^5$ poises or less, when measured at 250° C. and a frequency of 1 radian/sec.

6. A thermoplastic elastomer composition according to claim 1, which has a Newtonian viscosity index n of 0.67 or less, which is calculated from a complex dynamic viscosity $\eta^*(1)$ and a complex dynamic viscosity $\eta^*(100)$ measured at 250° C. and a frequency of 100 radian/sec., according to the following formula:

$$n = [\log \eta^*(1) - \log \eta^*(100)]/2.$$

7. A thermoplastic elastomer composition according to claim 1, which has $\eta^*(1)$ of $1.5 \times 10^5$ poises or less, and n of 0.67 or less.

8. A thermoplastic elastomer composition according to claim 1, wherein at least one polymer selected from the group consisting of said polyolefin resin (a), said ethylene-α-olefin copolymer rubber (b) and said ethylene-α-olefin copolymer rubber (c) is intermolecularly and/or intramolecularly crosslinked.

9. A thermoplastic elastomer composition according to claim 1, which further comprises a foaming agent.

10. A powder comprising a thermoplastic elastomer composition as claimed in claim 1, which has a sphere-converted average particle size of 1.2 mm or less, and a bulk specific gravity of at least 0.38.

11. A powder according to claim 10, wherein said thermoplastic elastomer composition has $\eta^*(1)$ of $1.5 \times 10^5$ poises or less, and n of 0.67 or less.

12. A powder according to claim 10, wherein an α-olefin in the ethylene-α-olefin copolymer (b) contained in said thermoplastic elastomer composition is an α-olefin having 4 to 8 carbon atoms.

13. A powder according to claim 10, wherein said ethylene-α-olefin copolymer rubber (b) contained in said thermoplastic elastomer composition is an ethylene-1-butene copolymer rubber or an ethylene-1-hexene copolymer rubber.

14. A powder according to claim 10, which is prepared by a solvent-treating method, a strand cutting method or a die-face cutting method.

15. A molded article comprising a thermoplastic elastomer composition as claimed in claim 1.

16. A molded article according to claim 15, which is produced by press molding.

17. A mold article according to claim 15, which is produced by power-slush molding a powder of said thermoplastic elastomer composition having a sphere-converted average particle size of 1.2 mm or less, and a bulk specific gravity of at least 0.38.

18. A molded article according to claim 15, which is a foamed molded article.

19. A multilayer molded article comprising at least one layer formed from a thermoplastic elastomer composition as claimed in claim 1.

20. A multilayer molded article according to claim 19, which further comprises a core layer of a thermoplastic resin.

21. The thermoplastic elastomer composition according to claim 1, wherein the amounts of ethylene-α-olefin copolymer rubbers (b) and (c) are 50 to 250 wt. parts and 10 to 250 wt. parts, respectively.

* * * * *

UNITED STATES PATENT AND TRADEMARK OFFICE
CERTIFICATE OF CORRECTION

PATENT NO.   : 6,331,360 B1
DATED        : December 18, 2001
INVENTOR(S)  : Sugimoto et al.

It is certified that error appears in the above-identified patent and that said Letters Patent is hereby corrected as shown below:

<u>Title page,</u>
Item [22], PCT Filed "Mar. 15, 1997" should read as -- Mar. 13, 1997 --.

<u>Column 1,</u>
Line 4, insert the sentence: -- This application is the national phase of International application PCT/JP/00794 filed March 13, 1997, which designated the U.S. --.

Signed and Sealed this

Fifth Day of November, 2002

*Attest:*

*Attesting Officer*

JAMES E. ROGAN
*Director of the United States Patent and Trademark Office*